US005896528A

United States Patent [19]

Katsuno et al.

[11] Patent Number: 5,896,528
[45] Date of Patent: *Apr. 20, 1999

[54] SUPERSCALAR PROCESSOR WITH MULTIPLE REGISTER WINDOWS AND SPECULATIVE RETURN ADDRESS GENERATION

[75] Inventors: Akira Katsuno, Kawasaki, Japan; Sunil W. Savkar, Palo Alto, Calif.; Michael C. Shebanow, Plano, Tex.

[73] Assignee: Fujitsu Limited, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/522,845

[22] Filed: Sep. 1, 1995

Related U.S. Application Data

[63] Continuation of application No. 08/398,284, Mar. 3, 1995, abandoned.

[51] Int. Cl.[6] .................................................. G06F 9/38
[52] U.S. Cl. .......................... 395/586; 395/569; 395/587; 395/800.23
[58] Field of Search .............................. 395/376, 580, 395/586, 587, 383, 480, 497.04, 569, 678, 800.23; 711/213

[56] References Cited

U.S. PATENT DOCUMENTS

| | | |
|---|---|---|
| 5,159,680 | 10/1992 | Joy et al. ................................. 395/800 |
| 5,179,673 | 1/1993 | Steely, Jr. et al. ........................ 395/375 |
| 5,226,142 | 7/1993 | Vegesna et al. ...................... 365/230.02 |
| 5,276,882 | 1/1994 | Emma et al. .............................. 395/700 |
| 5,307,502 | 4/1994 | Watanabe et al. .................... 395/800.41 |
| 5,313,634 | 5/1994 | Eickemeyer ............................... 395/700 |
| 5,454,087 | 9/1995 | Nanta et al. .............................. 395/375 |
| 5,526,498 | 6/1996 | Matsuo et al. ........................... 395/375 |
| 5,564,031 | 10/1996 | Amerson et al. ......................... 711/209 |
| 5,604,877 | 2/1997 | Hoyt et al. ............................... 395/590 |
| 5,655,132 | 8/1997 | Watson .................................... 395/674 |

FOREIGN PATENT DOCUMENTS

| | | |
|---|---|---|
| 0 310 455 A2 | 4/1989 | European Pat. Off. . |
| 0 432 774 A2 | 6/1991 | European Pat. Off. . |
| 0 433 709 A2 | 6/1991 | European Pat. Off. . |

*Primary Examiner*—Kenneth S. Kim
*Attorney, Agent, or Firm*—Fenwick & West LLP

[57] ABSTRACT

A superscaler processor capable of executing multiple instructions concurrently. The processor includes a program counter which identifies instructions for execution by multiple execution units. Further included is a register file made up of multiple register window pointer selects one of the multiple register windows. In response to the value of the current window pointer, a return prediction table provides a speculative program counter value, indicative of a return address of an instruction for a subroutine, corresponding to the selected register window. A watchpoint register stores the speculative program counter value. A fetch program counter, in response to the speculative program counter value, stores the instructions for execution after they have been identified by the program counter.

3 Claims, 2 Drawing Sheets

SUPERSCALAR PROCESSOR WITH MULTIPLE REGISTER WINDOWS AND SPECULATIVE RETURN ADDRESS GENERATION

Related Applications

This application is a continuation of U.S. patent application Ser. No. 08/398,284 filed Mar. 3, 1995, now abandoned, having the same title and inventors as the present application.

The subject matter of this application is related to the subject matter of the following applications:

application Ser. No. 08/388,602 entitled "INSTRUCTION FLOW CONTROL CIRCUIT FOR SUPERSCALER MICROPROCESSOR" filed on Feb. 14, 1995, by Takeshi Kitahara, now U.S. Pat. No. 5,689,673;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995, now abandoned, by Michael A. Simone and Michael C. Shebanow;

application Ser. No. 08/388,606 entitled "METHOD AND APPARATUS FOR EFFICIENTLY WRITING RESULTS TO RENAMED REGISTERS" filed on Feb.14, 1995, now abandoned, by DeForest W. Tovey, Michael C. Shebanow and John Gmuender;

application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender, now abandoned;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow, now abandoned;

application Ser. No. 08/397,810 entitled "PARALLEL ACCESS MICRO-TLB TO SPEED UP ADDRESS TRANSLATION" filed on Mar. 3, 1995, now abandoned, by Chih-Wei David Chang, Kioumars Dawallu, Joel F. Boney, Ming-Ying Li and Jen-Hong Charles Chen;

application Ser. No. 08/397,809 entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang, now issued U.S. Pat. No. 5,680,566;

application Ser. No. 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar, now abandoned;

application Ser. No. 08/397,891 entitled "METHOD AND APPARATUS FOR SELECTING INSTRUCTIONS FROM ONES READY TO EXECUTE" filed on Mar. 3, 1995, now abandoned, by Michael C. Shebanow, John Gmuender, Michael A. Simone, John R. F. S. Szeto, Takumi Maruyama and DeForest W. Tovey;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar, now issued U.S. Pat. No. 5,632,028;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow, now abandoned;

application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow, now abandoned;

application Ser. No. 08/398,151 entitled "METHOD AND APPARATUS FOR RAPID EXECUTION OF CONTROL TRANSFER INSTRUCTIONS" filed on Mar. 3, 1995 by Sunil Savkar, now abandoned;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING A ZERO BIT STATUS FLAG IN A MICROPROCESSOR" filed on Mar. 3, 1995 by Michael Simon, now issued U.S. Pat. No. 5,638,312; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu, now issued U.S. Pat. No. 5,687,353;

each of the above applications having the same assignee as the present invention, and each incorporated herein by reference in their entirety.

FIELD OF THE INVENTION

The present invention relates to methods and apparatuses for controlling instruction flow in data processors and, in particular, for reducing the time for return from program flow changes such as the execution of subroutine calls and other similar instruction codes using return prediction.

BACKGROUND OF THE INVENTION

Many current data processors are able to execute multiple instructions at one time by using many sets of execution units, particularly through the use of pipelining and superscalar issue architecture. Pipelined computers allow multiple instructions to exist in various stages of execution simultaneously. Superscalar computers use multiple instruction execution units and execute operations on available data. Additionally, data processor clock speeds are becoming increasingly faster, with many data processors operating in excess of 100 MHz. In microprocessors employing these attributes, controlling instruction flow inside the data processor is very important to achieve the highest possible performance. In particular, it is necessary to control the flow of instructions to the execution units where multiple instructions are available for execution and the execution units are in various states of availability. Maximizing performance requires determining which instructions are executable, which execution units are available, and minimizing the delay in passing the executable instructions to available execution units.

For the processors which can execute instructions speculatively, branch direction (taken or not-taken), or branch address (target address or address next to the branch instruction), can be predicted before they are resolved. Later, if these predictions turn out to be wrong, a central processing unit backs up to the previous state, and then begins executing instructions in the correct branch stream. In conventional processors, plural control branches are often ready to evaluate in one cycle; however, these conventional processors evaluate only a single branch prediction per cycle. Not-selected control transfer evaluations which are ready for evaluation must therefore be delayed. Delaying control transfer evaluations detracts from central processing unit performance and evaluating control transfers as early as possible can significantly improve performance.

An instruction set within a data processor usually contains a multitude of transfers of that instruction flow from a current pointer and a program counter located in the instruction flow to a new location. When the new location is the start of a sub-routine call or a piece of code that will be executed, there will be a need to return to the original instruction set from where the call was made. Generally, the subroutine is a short sequence of code to which the instruction flow calls on to execute and then returns to the main location of the code sequence.

When the instruction leaves the main code sequence from a first location on the program counter, it jumps to a second location on the program counter where the start of the desired sub-routine is designated. Once the sub-routine call is complete, the instruction flow must jump back, not to the first location, but to a third location which designates the next instruction in the main code sequence. Jumping back to the first location simply executes the same sub-routine call such as when a retry is needed for a default loop. The procedure of making the call to transfer the instruction flow and then waiting for its return to the main code sequence is one of the limiting factors on the execution speed of the microprocessor.

Specifically, the return is controlled through a register value which is read. This value is stored to a dedicated register of some type, depending on the microprocessor architecture. It may store a value equivalent to the program counter at the first location or to another location already advanced to the next instruction. This value functions as the return address stored in the register file which can be any file specifically stated to hold the location of the return from the program flow change. The execution is stalled waiting for that register to be read, waiting for that return address to be put back into the program counter, and waiting to continue the program execution.

Accordingly, it is desirable to provide an improved instruction flow that reduces the time required for the execution of returns from any program flow changes or controlled transfers, and further provides for efficient and rapid execution of program instructions.

SUMMARY OF THE INVENTION

The present invention provides a method of accelerating the return from program flow changes in the execution of a program containing a plurality of instructions. The method includes the step of fetching a program flow change and determining if the program flow change contains a return instruction. A value of a program counter is registered that identifies a location in the program for the return from the program flow change. The program flow change is executed. A predicted value is speculated from a return prediction table and the program flow change returns in accordance with the speculative value.

The present invention also contemplates an apparatus including a processor having an instruction flow control circuit for executing a program having a plurality of instructions. The circuit includes a fetch program counter, a program counter, and a register file. The apparatus includes a return prediction table coupled to and accessable by the fetch program counter prior to any point the fetch program counter can access the register file.

DETAIL DESCRIPTION OF THE PREFERRED EMBODIMENTS

Generally, the present invention contemplates the acceleration of control transfer instructions for the microprocessor in order to speed up the overall execution capability of the computer. In this case, the jumps and returns from those jumps. There is a special class of jumps that this application relates to. In particular, there are jump instructions that are used in calls to sub-routines and return to the program counter from those jump instructions.

Figure 1:
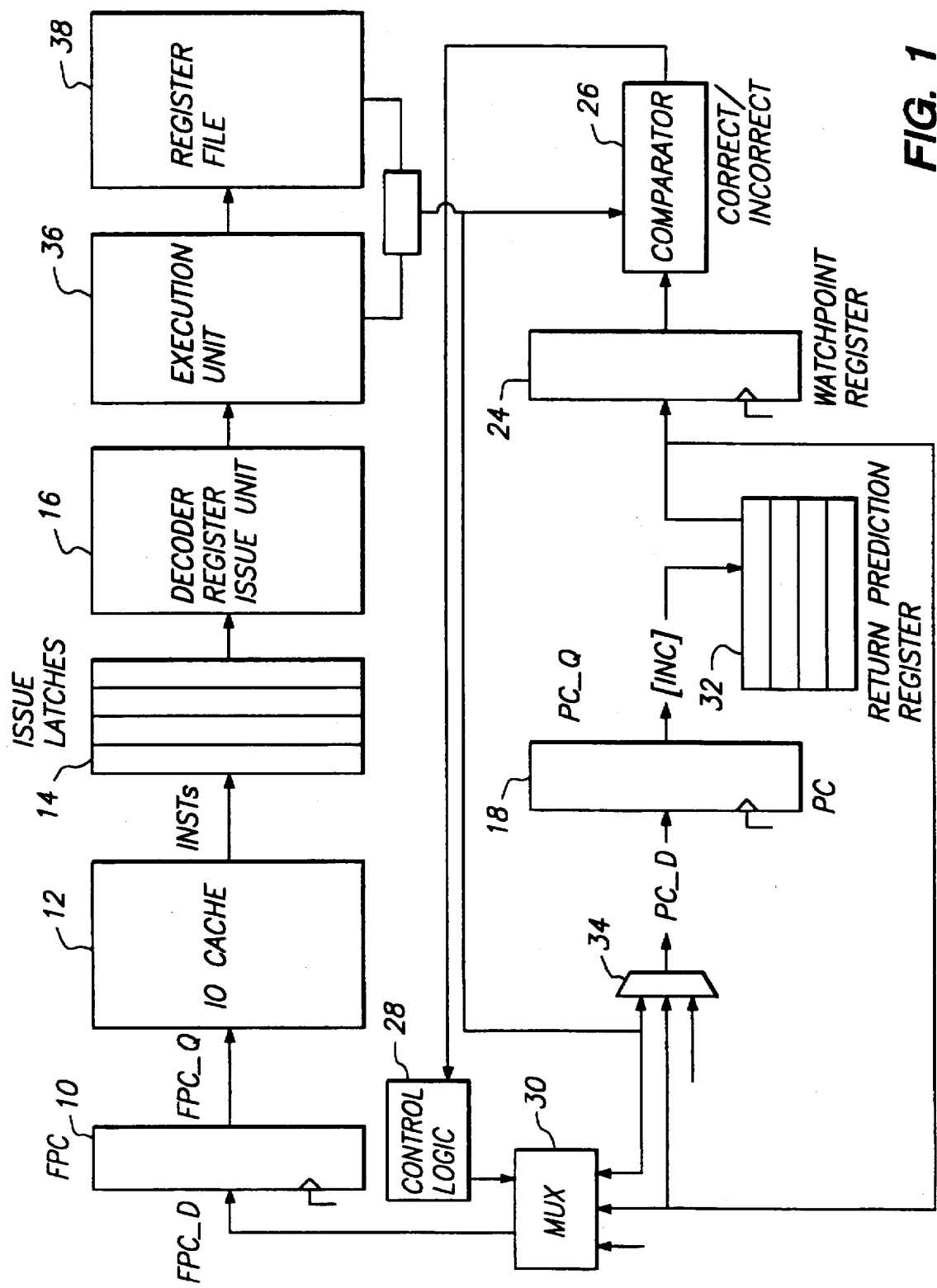
FIG. 1 is a block diagram of an embodiment of the present invention including a return prediction register for accelerating the return from a program flow change in a microprocessor.

FIG. 1 is a block diagram of an embodiment of the present invention, including a fetch program counter 10, an instruction memory 12, a plurality of issue latches 14, and a decoder register file 16 of the issue unit. Fetch program counter 10 receives an input fetch program count indication FPC_D, and produces an output fetch program count indication which it provides as an input to instruction memory 12, according to the present invention. In turn, instruction memory 12 produces a count of instructions fetched, FETCH_CNT, as well as providing fetched instructions in accordance with the fetch program count to issue latches 14. Issue latches 14 in turn provide an indication of the number of valid instructions, NV_Q, in the issue latches 14, and further provide issued instructions to decoder register file issue unit 16 which is coupled in turn to an execution unit 36 and a register file 38. Decoder register file issue unit 16 provides a count of instructions issued, ISSUE_CNT. More particularly, as discussed later, EI=K means the number of a particular issue latch entry, and NV_Q is the number of instructions in the issue latch which are valid, i.e., 0<=nv_q<=k, where k is the number of a particular issue latch entry. Further, "PC_Q" means the current program counter (PC) value in the issue cycle; "FPC_Q" means the fetch program counter value (FPC) in the current cycle; "FETCH_CNT" is the number of instructions which are fetched, i.e., 0<=FETCH_CNT<=j; "ISSUE_CNT" means the number of instructions which are issued, i.e., 0<=issue_cnt<=min{i, NV_Q}; and "NV_D" is the number of instructions which will be valid in the next cycle.

A program counter 18 clocks once per cycle, responding to an input program count signal from multiplexer 34, PC_D, with an output program count signal, PC_Q. The program count provides an indication of the architectural device operating in the current cycle. In particular, "PC_D" is the value of the next program count (PC); and "FPC_D" is the value of the next fetch program count (FPC).

Figure 2:
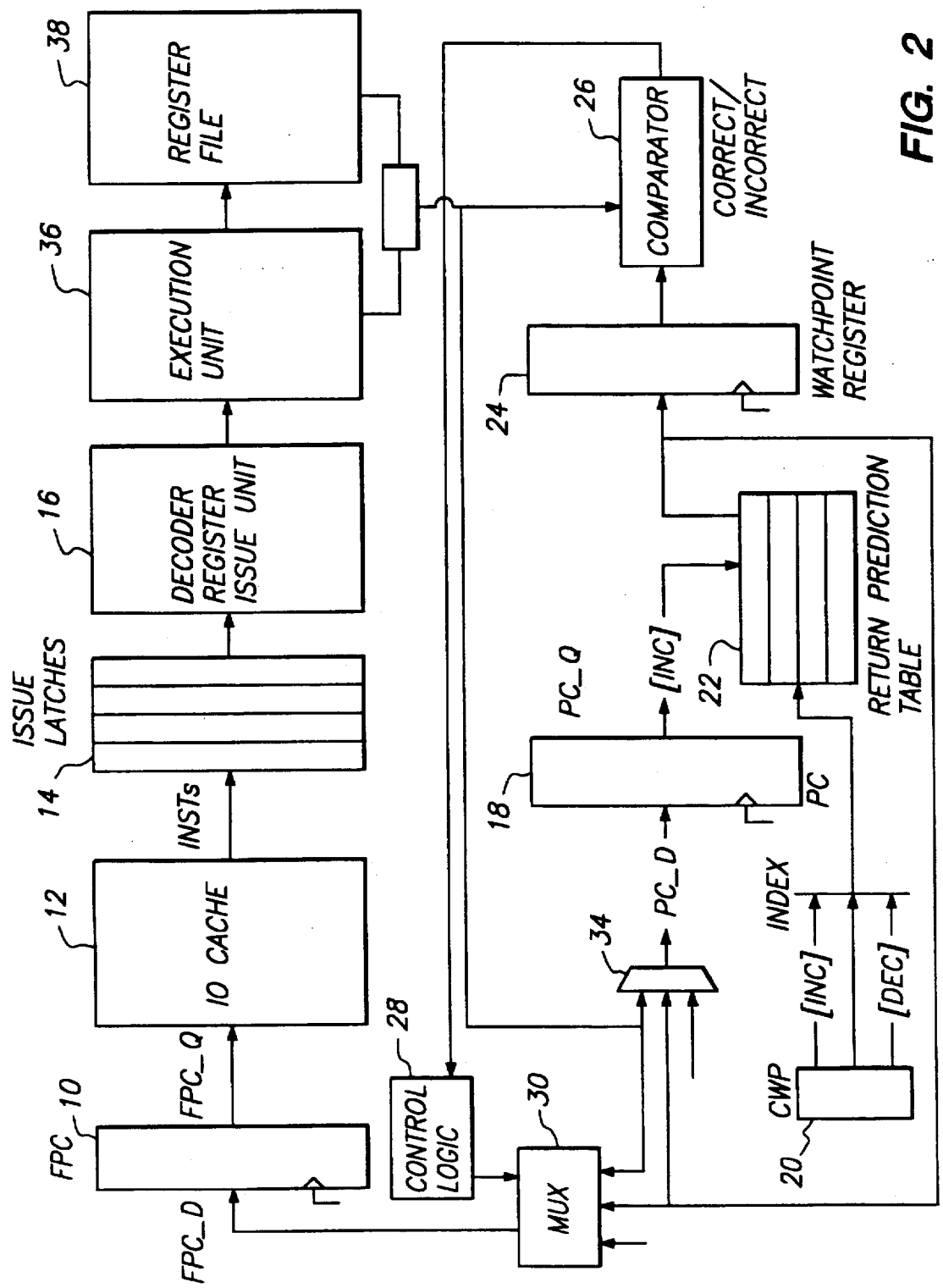
FIG. 2 is a block diagram of an embodiment of the present invention including a return prediction table for accelerating the return from a program flow change in a microprocessor.

Referring to FIG. 2, a specific embodiment is illustrated with a current window pointer 20 indexing into a return prediction table 22. The current window pointer 20 identifies one or more register windows. Register windows are used when executing a control transfer, such as a subroutine. During a subroutine call, a save at the top of a subroutine call is performed and changes to a new register window. As a result, several free register windows are used without changing or modifying the state of the previous routine that called that subroutine.

There are usually a small number of registers reserved at the beginning of a sub-routine call so that they are available for other functions in the sub-routine. Before returning to the main code sequence, those values are usually pulled back from memory into the registers that were reserved. Some conventional architectures, such as the X86 architecture, accomplish this task inherently.

In most RISC architectures, however, there is a large register file without any specialties to instructions. The instructions are kept very simple to maximize speed of execution. As a result, the windows must be registered explicitly. When there are only a small number of registers available while performing a sub-routine call, the contents of the current register must be saved often to memory. To perform tasks using those contents or data, they must be pulled back from storage in memory using loads. The register windows allow this procedure to occur without involving the software.

The SPARC V9 architecture uses the call register windows which, at the beginning of a sub-routine call, does a change of windows. The original set of registers which were being used for the original program, from whence the call came, are reserved. They are not available for use. They are stored off and instead a swap is preformed to a new window of values which are available to read and write. The hardware supports a large number of registers even though only a small number of registers are addressed at any one time. In the SPARC V9 architecture for example, registers are defined with five bits, allowing access to thirty-two logically addressable registers at any one time.

The current window pointer explicitly functions by pointing into a window of address values which are stored off. The inventive embodiment receives a call instruction or a JUMP call instruction and decodes during fetch time. One of these instructions issues into the microprocessor and simultaneously writes the instruction to the register value of the current window. For the SPARC V9 architecture, this is register 15.

At the same time, the value based on the current window pointer is written into the file that is indexed by the current window pointer. For the SPARC V9 architecture, there are four register windows. The current size a pointer is 2-bits in size and, accordingly, indexes explicitly to 4 distinct locations. Thus, when performing a return, such as, but not limited, to a JUMP return, a restore, or a retry, the current window pointer restores that program counter in that location that has been written into the return prediction table which is addressable.

The present invention can readily be used in other microprocessor systems. For example, the current window pointer can have more than 2-bits. Accordingly, with 8 register windows there would be 3 bits and correspondingly more with larger numbers of register windows.

Performing a save or restore moves back to another register window. Saving increments (INC) the current window pointer. Restoring decrements (DEC) the current window pointer. The current window pointer usually does not jump from 00 to 11, except in performing back-ups or the like. For a SPARC V9 architecture which speculatively executes instructions, if instructions were speculated incorrectly at some prior time at location X minus delta, the execution backs up to this prior location. If the current pointer gets backed up, the program jumps value.

The index and the return prediction table are separate from the register file itself. In this embodiment, there are four registers that are addressable by a decoder into the four registers.

The return prediction table is used to speculatively execute the return. In situations in which the return value is incorrect, it is pushed onto the stack. The FPC fetch program counter is a speculative PC. That value back is fed back into the FPC for use in fetching instructions into the issue latches. When a value is popped off to speculate with, it will be stored in a watch point register 24. The watch point register is pointed at once the actual return is finished execution.

The watchpoint register and method is preferred for use with the present invention, but conventional techniques are also suitable. The watchpoint register can watch a plurality of predicted branch or jump-and-link instructions simultaneously. Second, it can grab a plurality of condition-code data or calculated jump-and-link addresses, for which predicted branch or jump-and-link instructions are waiting, by simultaneously monitoring or watching data forward buses from a plurality of execution units. Third, it can generate a plurality of misprediction signals of branch or jump-and-link instructions simultaneously. Fourth, it can store an alternate branch address or a predicted jump-and-link address in a single shared storage area. Fifth, it sends the correct branch address or jump-and-link address for instruction fetch when misprediction is detected by watchpoint.

The watchpoint registers are multipurpose. They check branch predictions, JMPL predictions, and supply a correct branch/JMPL address for refetching instructions after a backup when the original prediction was incorrect. They are called "watchpoint" registers because they sit on data forward distribution buses and monitor results from the several execution units. There are usually watchpoint registers corresponding to each checkpoint.

The function of the return prediction table is to provide speculative values of what the return address will be prior to the finish of execution of the instruction. A comparison is made through a comparator 26 to assure that the predicted value was actually correct. The comparator 26 leads into a control logic 28 which is one of the feeds into a multiplexer 30. If the comparison is incorrect, the program flow will back up and the correct return value is routed eventually to the FPC and to the PC.

Referring to FIG. 1, a single window register 32 is used when there is no need to increment or decrement the values. Usually this embodiment is used for the last PC that is called. Since the calls come in pairs with a return, this embodiment is useful with that final call.

As demonstrated above, the present invention uses an indexed return prediction table for accelerating the fetch of instructions for the return from any type of program flow change or control transfer. As a result, the execution of the system or apparatus hardware is accelerated.

The present invention fetches a program flow change and determines if it contains a return function. As a result, the present invention stores the PC value for the return address from a program flow change in the return prediction table indexed by the current window pointer. The current window pointer may be defined by the hardware itself. The fetch program counter 10 and the PC 18 are updated in the case of a return from program flow change by indexing with the current window pointer into the return prediction table.

In a conventional microprocessor, instructions, such as a subroutine call, which indicate a program flow change, are fetched and executed by the system. It is after fetching of the instruction that the PC value is written. Usually, although not necessarily, this occurs while issuing the instruction to the remainder of the system. In the preferred embodiment, the storing of the PC during the call will occur during the issue of the call. Once the instruction is complete, a comparison is performed to determine whether a correct or incorrect value was predicted. If an incorrect value was predicted, a new value is updated and the program flow is backed-up to the location prior to the execution of the incorrect program change.

Specifically, the FPC is updated when the instructions are fetched and when the instructions move to the issue latches. The PC is updated after the FPC and usually during issue or when the instructions are executed.

In returning from a program flow change, the present invention fetches instructions ahead of the location where the instructions will actually be executed in the code sequence. In order to speed up the execution, the present invention fetches from a predicted location instead of waiting for the return. Otherwise, the return instruction would have to be executed before reading the contents of that register which previously was written with the result of the return. In order to read that register, the instruction has to be executed normally.

The value is known once the register file is read. While staying ahead of the program execution, the issue and the whole register file reprocess, store that same value that's written into the register file and restore that value onto a stack. When a program change is issued, the value is taken and run through the register file and pushed onto a stock that is accessible by the fetch program counter logic.

At this point in the program flow change, the fetch program logic will see a return instruction and perform the return in particular. Now, when it sees this specific instruction, it realizes that this instruction is going to get results from the register files at sometime X plus delta, or at a third location in the main code sequence. That same value is stored onto the stack and the return is synchronized. For example, if there are three returns in succession and none have been performed, the first return will always be with respect to the last jump issued. Therefore, the top of the stack is always matched to the first jump return performed. In the event of performing a jump return, the stack is popped and the value is taken off the PC and placed into the FPC at the appropriate moment. This continues along well in advance of the completion of the return instruction itself.

Below are selected examples of the method of the present invention for a four instruction-wide superscalar processor, according to the relationship (i,j,k)=(4,4,4) and assuming that the instruction code presented is used with each example. The first example refers to the embodiment set forth in FIG. 1.

// write operation
if (issue CALL) then
write "PC_of_CALL+8 (or 2)" into RPR; endif;
//read operation
if (fetch RET) then
read the value and set to FPC; endif;
PC_Q: the current PCT in the issue cycle.

FPC_Q: fetch PC in the current cycle.
PC_D: the next PC.
FPC_D: the next FPC.

| PC | Instruction | | | |
|----|----|----|----|----|
| 10 | S0 | | | |
| 11 | S1 | | | |
| 12 | S2 | | | |
| 13 | CALL | —> | 30 | T00 |
| 14 | D0 | | 31 | T01 |
| 15 | S3 | <—+ | ... | |
| 16 | S4 | +— | 35 | RET |
| | | | 36 | D00 |

[Cycle x]
FPC_Q: 30, Instructions in FETCH:T00, T01, T02, T03
PC_Q: 11, Instructions in ISSUE: S1, S2, CALL, D0
-write PC=15 into Return Prediction Register.
FPC_D: 34
[Cycle x+1]
FPC_Q: 34, Instructions in FETCH: T04, RET, D00,-
PC_Q 30, Instructions in ISSUE: T00, T01, T02, T03
-read the PC from Return Prediction Register
Predict the target PC of RET.
FPC_D: 15
[Cycle x+2]
FPC_Q: 15, Instructions in FETCH: S3, S4, S5, S6
PC_Q: 34, Instructions in ISSUE: T04, RET, D00,-
FPC_D: 19

The following example refers to the embodiment illustrated in FIG. 2.

| PC | Instruction | | | |
|----|----|----|----|----|
| 10 | S0 | | | |
| 11 | S1 | | | |
| 12 | S2 | | | |
| 13 | CALL | —> | 30 | T00 |
| 14 | D0 | | 31 | T01 |
| 15 | S3 | <—+ | 32 | T02 |
| 16 | S4 | \| | 33 | SAVE |
| | | \| | 34 | D00 |
| | | +— | 35 | JMPL_RET |
| | | | 36 | D01 |

[Cycle x]
FPC_Q: 30, Instructions in FETCH: T00, T01, T02, SAVE
PC_Q: 11, Instructions in ISSUE: S1, S2, CALL, D0
CWP_Q: 01
-write PC=15 into 1r47 in RPT.
  NOTE: The address of ALL is stored r[15]. CWP=01, then the logical register is 1r47.
FPC_D: 34
[Cycle x+1]
FPC_Q: 34, Instructions in FETCH: D00, JMPL_RET, D01,-
PC_Q: 30, Instructions in ISSUE: T00, T01, T02, SAVE
CWP_Q: 01
-read PC=15 from 1r47.
  NOTE: CWP_Q is incremented before RPT access. CWP becomes 10.
The return address of JMPL_RET is 'r [31]+2'
// write operation

```
if (issue CALL or JMPL_CALL) then
  write "PC_of_CALL+8 (or 2)" into the entry indexed by
    CWP.
// read operation
if (SAVE sits in the issue or fetch cycle before JMPLs)
  then CWP=CWP_Q+1;
else if (RESTORE sits in the issue or fetch cycle before
  JMPLs) then CWP=CWP_Q-1;
else CWP=CWP_Q;
endif; endif;
if (fetch JMPL_RET or JMPL_RETL) then read the
  value from the entry indexed by CWP and set to FPC;
endif;
use address of CALL or JMPL_CALL stores in r[15].
rs1 of JMPL_RETL=r[15].
rs1 of JMPL_RET=r[31].
```

| CWP[1.0] | : | r15 | r31 |
|---|---|---|---|
| 00 | : | 1r15 | 1r63 |
| 01 | : | 1r63 | 1r47 |
| 10 | : | 1r47 | 1r31 |
| 11 | : | 1r31 | 1r15 |

To those skilled in the art, the present invention is useable with many processor applications and instruction set descriptions other than what is illustrated herein. Specifically, the use of the term counter window pointer can include using any pointer with the present invention. The term return prediction table can include stacks as well as single registers. Furthermore, the present invention is useable in any application wherein there is a return from a program flow change or from a controlled transfer including, but not limited to, the retry of a default condition. The present invention contemplates the return to either the original location in the main code sequence or to a location predetermined by a hardware or software change.

What is claimed is:

1. A superscalar processor which executes a plurality of instructions concurrently, the processor comprising:

a plurality of execution units;

a program counter which identifies an instruction for execution by said execution units;

a register file comprising a plurality of register windows each of said register windows useable in a separate subroutine call;

a current window pointer which selects one of said register windows;

a return prediction table which provides a speculative program counter value indicative of a return address of an instruction for a subroutine, corresponding to said selected register window, prior to completion of execution of said subroutine in response to the value of said current window pointer;

a watchpoint register for storing said speculative program counter value; and a fetch program counter, responsive to said speculative program counter value, for storing an instruction for execution subsequent to said instruction identified by said program counter.

2. A superscalar processor as set forth in claim 1 further comprising a comparator which compares said speculative program counter value with an actual return address to determine if said speculative program counter value is correct.

3. A superscalar processor as set forth in claim 2 further comprising control logic responsive to said comparator, for storing a correct program counter value in said program counter if said speculative program counter value is incorrect.

* * * * *